June 30, 1970     A. H. LAVILLE ET AL     3,517,898
LIFT AND PROPULSION DEVICE FOR A JET AIRCRAFT OF THE
HYBRID HELICOPTER-AUTOGYRO TYPE
Filed Dec. 1, 1967     4 Sheets-Sheet 1
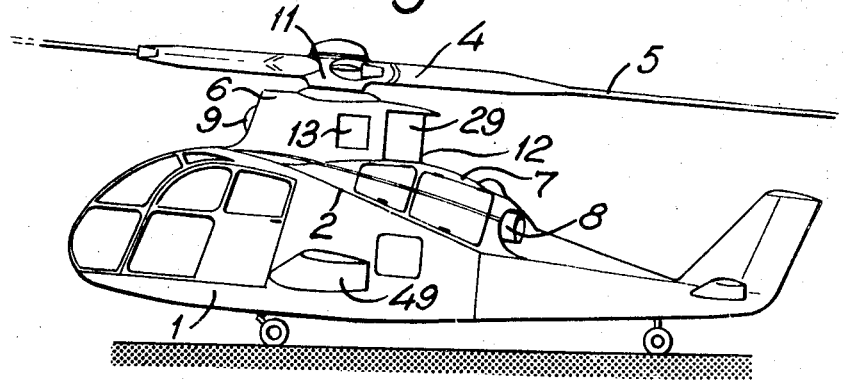
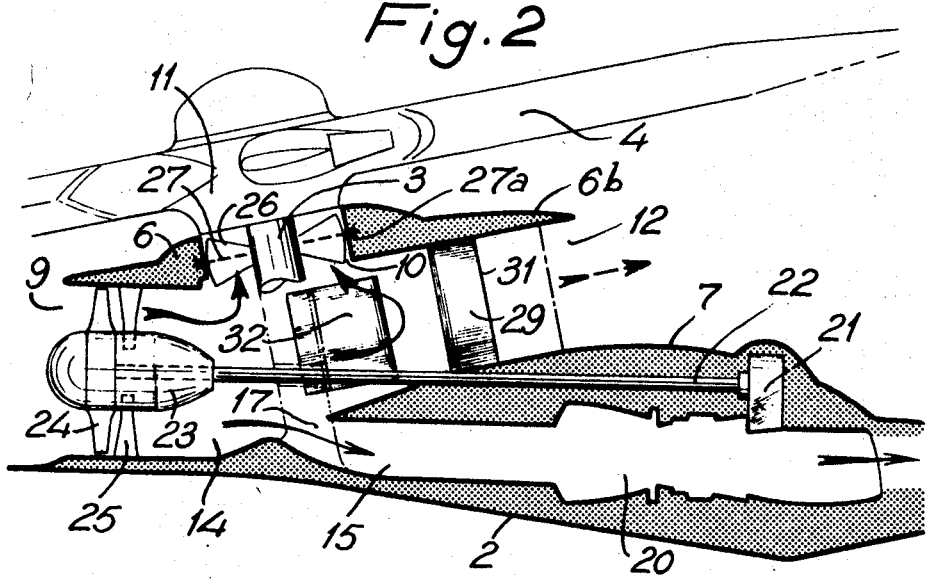
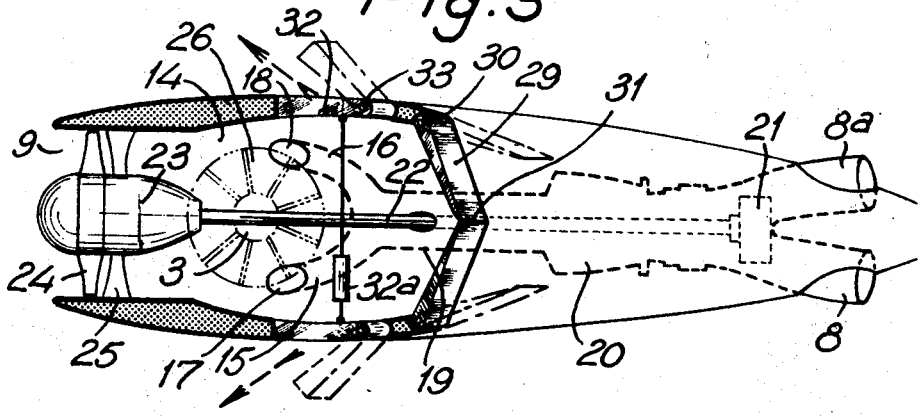

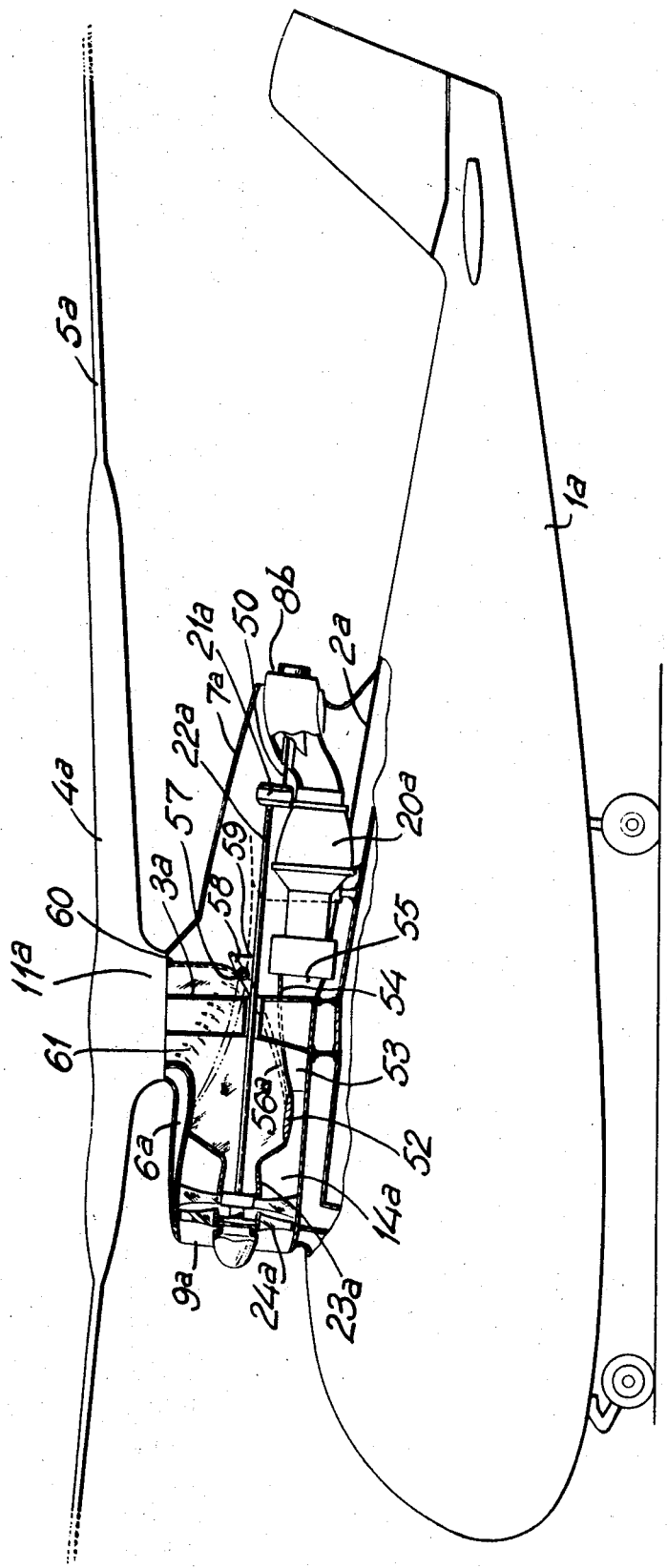

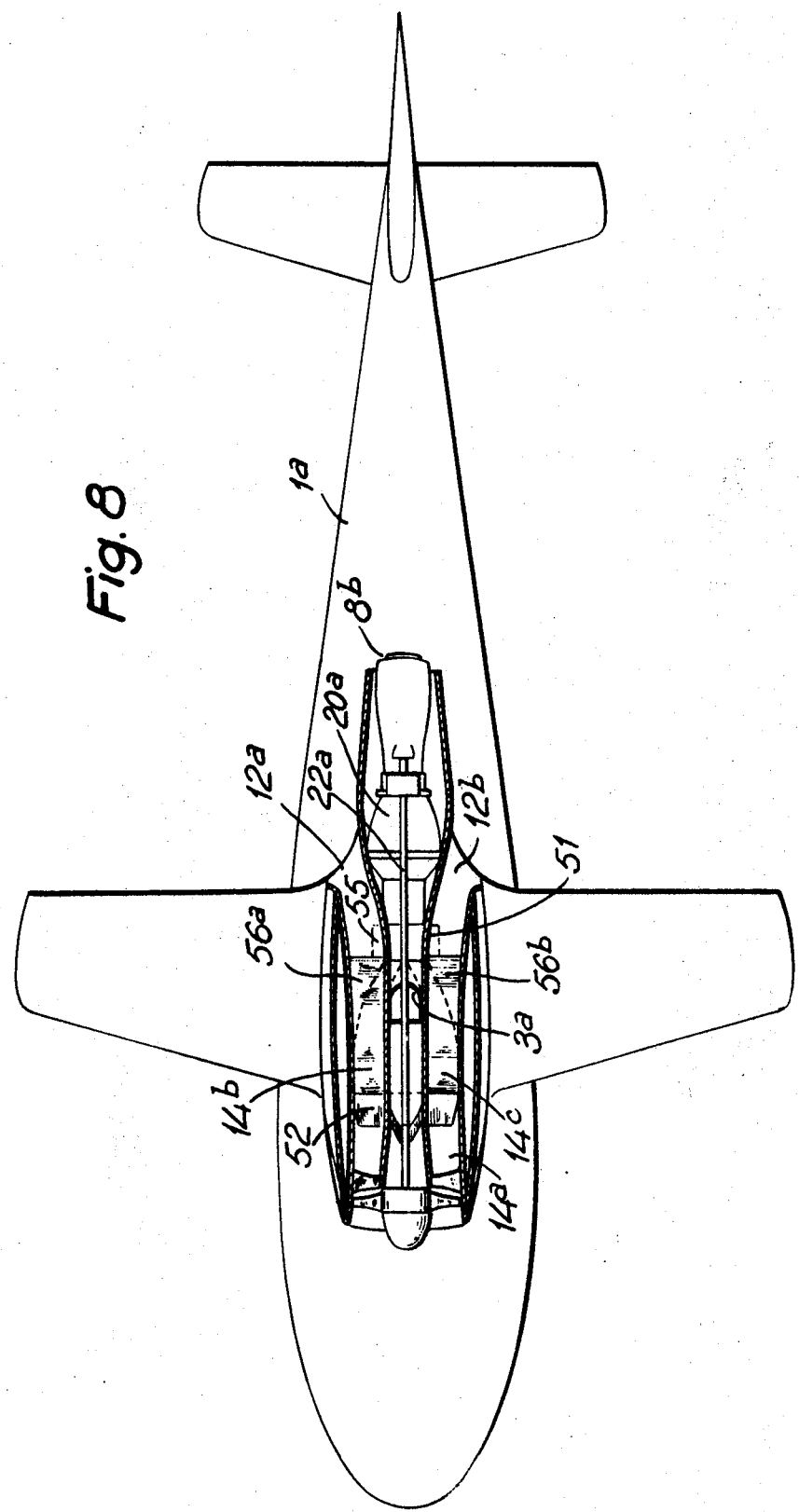

United States Patent Office 3,517,898
Patented June 30, 1970

3,517,898
LIFT AND PROPULSION DEVICE FOR A JET AIRCRAFT OF THE HYBRID HELICOPTER-AUTOGYRO TYPE
Andre Henri Laville, Enghien-les-Bains, and Francis Henri Marie Joseph Maillard, Courbevoie, France, assignors to Sud-Aviation Societe Nationale de Constructions Aeronautiques, Paris, France
Filed Dec. 1, 1967, Ser. No. 687,262
Claims priority, application France, Dec. 30, 1966, 89,485
Int. Cl. B24c 27/22
U.S. Cl. 244—7                                 6 Claims

ABSTRACT OF THE DISCLOSURE

A propulsion and lift system using compressed air reaction for a hybrid helicopter-autogyro type aircraft, in which a high-mass-flow/medium pressure air compressor is disposed ahead of a large repartition chamber from which extend ducts for a turbine engine, externally disposed with respect to said chamber, for a rotor driving means and for a propulsive air exit, the ducts being associated with distribution means the actuation of which is such that the total section of the passages for the compressed air remains nearly constant.

---

The present invention relates to a propulsion and lift device utilizing the reaction of compressed air and applicable to a hybrid helicopter-autogyro type aircraft, characterized in that it includes, preferably at the base of a main-rotor supporting pylon, a powerplant in which a gas turbine engine having a power take-off turbine-wheel is connected to a transmission shaft through a reduction gear, which shaft drives a high-flow-rate medium-pressure air compressor positioned in front of the inlet of a distribution chamber into which enters at least one opening for supplying air to said engine, an opening for supplying air to the hub of the jet-driven main rotor, and at least one propulsion exit, distribution means proportioning the air delivered to said propulsion exit or exits and to said main rotor.

The conventional helicopter uses a main rotor for acquiring its climbing speed and its forward speed, but the latter is comparatively limited by the very nature of the rotor.

This led to considering hybrid helicopter-autogyro designs.

Various solutions have been adopted with the aim of increasing the forward speed, of which two notable examples were:

First, a design in which the main rotor was no longer required to supply the propulsive force, which was produced instead by one or more auxiliary propellers, jet propulsion devices, or both at once; and Second, a design in which the rotor was either partially or wholly relieved of the lift function by fixed wings on the fuselage.

In each case the drive system must include mechanical means enabling it to adapt to flight in the helicopter mode, the autogyro mode, or both modes at once.

Such mechanical means require gears, freewheels, clutches and the like, which entail complications and increase the dead weight.

Machines powered by bypass jet engines have also been used. In such engines, the cold secondary flow surrounding the hot primary flow can be employed either for propulsion in forward flight or for providing the jet drive to the main rotor for flight in the helicopter mode. With such a design, however, the flight speed of the aircraft must be fairly high by design if the efficiency of the bypass jet engine is to be satisfactory. Further, in this type of machine, large pressure losses occur in the drive-flow circuit and transmission efficiency is only mediocre.

This invention has for its object a propulsion system based on the reaction force of compressed air, that is applicable to a hybrid aircraft of the helicopter-autogyro type and overcomes the foregoing disadvantages.

A lift and propulsion system for a hybrid helicopter-autogyro aircraft includes, preferably positioned at the base of a rotor-supporting pylon mast, a powerplant in which a turbine engine having a power take-off turbine wheel is associated through a reduction gear and a transmission shaft to a high-flow-rate medium-pressure air compressor, a distribution chamber forming the exit end of said compressor and at the same time a turbine air suction space, said chamber being equipped with means for directing and regulating the compressed air flow on the one hand to the rotary wing and on the other to air ejection exits for propelling the aircraft or braking the same.

In one specific form of embodiment, a plurality of such directing and regulating means is used.

In an alternative constructional form, these means are reduced to a single device.

The description which follows with reference to the accompanying non-limitative exemplary drawings will give a clear understanding of how the invention can be carried into practice.

In the drawings:

FIG. 1 is a schematic side elevation view of a combined aircraft of the kind hereinbefore defined.

FIG. 2 illustrates schematically in part-sectional side elevation a lift-propulsion system, the section being taken through the fore-aft axis of the aircraft.

FIG. 3 is a diagrammatic plan view corresponding to FIG. 2.

Figure 6:
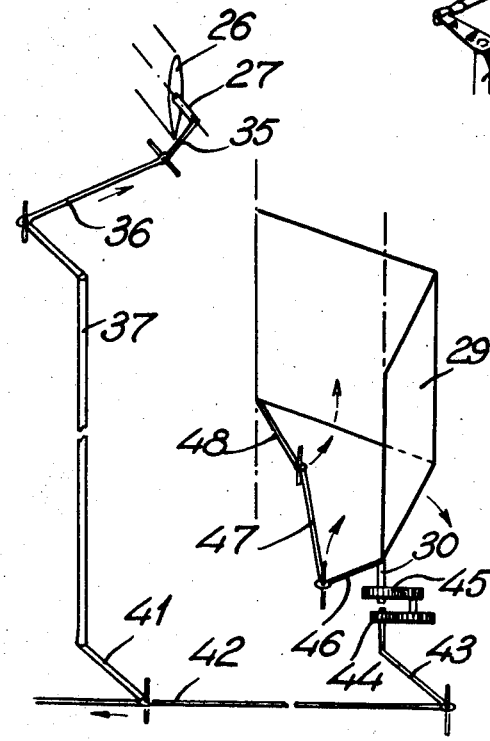

FIG. 6 schematically illustrates a system of cross-linked controls between multiple guiding and regulating elements.

FIG. 7 shows diagrammatically in side elevation, with partial clutaway, an alternative constructional form in which the air is apportioned by a single flap.

FIG. 8 is a plan view corresponding to FIG. 7.

In the constructional form of FIG. 1, the top of the fuselage 1 of a hybrid helicopter-autogyro comprises a supporting plateform 2 on which are mounted a lift and propulsion system together with the drive and control components thereof.

In particular, there is mounted on supporting platform 2 a rotor mast 3 supporting a freely rotatable rotor 4. The latter is driven by admitting compressed air into the rotor hub, this air being ejected through suitable nozzles formed at appropriate locations along the hollow portions of the rotor blades 5. The rotor accordingly surmounts a cowling 6 over the fuselage 1, and, partially also at the rear, a cowling 7 which surrounds a powerplant and from which emerge ejection nozzles 8.

The cowling 6 is formed with a frontal opening 9, with an opening 10 matching the hub 11 of rotor 4 and traversed by mast 3, and with rear openings 12 and lateral openings 13.

As FIGS. 1 and 3 clearly show, the cowling 6 forms an internal distribution chamber 14 which communicates with ducts 15 and 16 having ports at the bottom of said chamber at 17 and 18, and these ducts 15 and 16 join into a single duct 19 for admitting air into a gas turbine engine 20 which is merely outlined schematically in the drawings and which preferably exhausts through two exhaust nozzles 8 and 8a as stated precedingly (see FIG. 3). The engine 20 is enclosed in the cowling 7.

The gas turbine engine preferably includes an exit turbine-wheel independent of the wheel driving the engine compressor, and this exit turbine-wheel drives the input gearwheel of a mechanical reduction gear 21, the output gearwheel of which is rigid with a transmission shaft 22 partly enclosed in cowling 7 and extending in a forward direction from reduction gear 21. The shaft 22 passes through the front of cowling 7 and through the lower wall of chamber 14 and into the bottom of cowling 6, and thereafter into the streamlined rear portion of a central hub or bullet 23, where it is rigidly connected to a low-pressure/high-flow-rate compressor wheel 24 the blades of which cooperate with guide vanes 25 behind the wheel 24, these vanes forming bracing struts which support the bullet fairing 23 and the hub bearings and which are fixed to the inner surface of chamber 14, downstream of the intake 9.

In the opening 10 which is formed at the top of the wall of chamber 14 and which is coaxial with rotor mast 3 fixed to supporting platform 2 there is disposed a set of movable radial vanes 26. The streamlined vanes 26 of this first set thereof are respectively supported by associated rods 27 carried in bearing 27a, and these rods form pivots operable by means of a control 28 to be described hereinafter. The role of this first set of vanes is to control the air flow delivered by compressor 24 into distribution chamber 14 and thereafter into the rotor 4.

The rear distribution chamber opening 12 above cowling 7 can be occluded to a varying extent by a pair of flaps 29 mounted on hinge-pins 30 fixed with the lateral structure of the casing of chamber 14, at the edge thereof, whereby the opening 12, which is bounded at the top by a covering portion 6b of cowling 6 and at the bottom by cowling 7, is in fact bounded by the lips 31 of flaps 29. As already stated, the flaps 29 can be operated in order to either completely cover the opening 12 (as shown in solid lines in FIGS. 2 and 3) or completely open the same (as shown in dot-dash lines).

Similarly, the lateral openings 13 can be more or less occluded by symmetrical flaps 32 associated with a control 32a and having their rear ends pivotally connected by means of hinge-pins 33 at either edge of the openings 13, the open and closed positions of flaps 32 being depicted in the same way as those of flaps 29.

Figure 4:
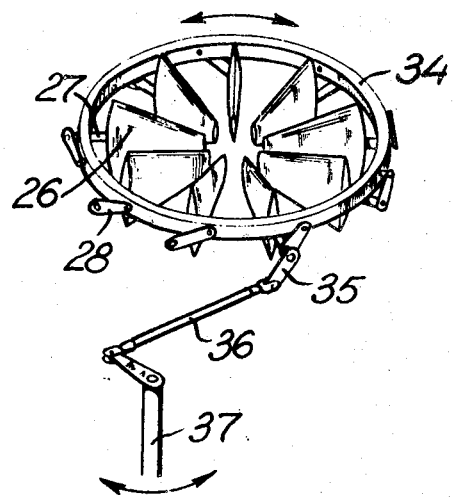
FIG. 4 is a perspective view of a first embodiment of a device for adjusting the air intake into the helicopter rotor.

As shown in FIG. 4, the first set of vanes 26 is actuated by arranging each vane pivoting rod 27 to be rigidly connected to a bell-crank 28, and these several bell-cranks are pivotally connected to a rotatable ring 34 which synchronizes the rotations thereof and hence those of the vanes. One of the vane supporting rods 27 is connected to an intermediate link 35 which is pivotally connected to a link-rod 36 which, in conjunction with a shaft 37 bearing an arm thereon, forms the first control elements of the device for controlling the supply of air to the main rotor.

Figure 5:
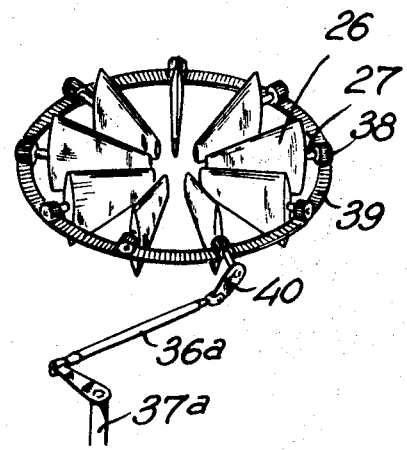
FIG. 5 shows in perspective an alternative embodiment thereof.

In the alternative embodiment shown in FIG. 5, each shaft 27 bearing a vane 26 carries a pinion 38 thereon, and the several pinions mesh with a ring-gear 39. One of these pinion shafts is furthermore rigidly connected to an intermediate link 40 adapted to be actuated by a link-rod 36a and a control member 37a similar to those just described.

In order to ensure synchronized control of the sets of vanes 26 and flaps 29 referred to hereinabove, the vanes 26 are actuated via their rods 27 and intermediate link 35 by a link-rod 36 which is in turn actuated by a crank-shaft 37 bearing a further crank-arm 41 pivotally connected to a link-rod 42. Through the medium of a crank-arm 43, an extension of link-rod 42 is capable of rotating the gearwheel 44 of a train of gears of which the output gearwheel 45 is rigid with a hinge-pin 30 of one of the flaps 29. Hinge-pin 30 bears a crank-arm 46 which, via a link-rod 47, operates the hinge-pin of the opposite flap through a companion crank-arm 48. A conventional linkage system operated from the pilots cabin extends to link-rod 42 which, when it shifts, rotates the shaft 37 and thereby operates the vanes 26 so as to open or close the duct forming an extension of rotor-supplying opening 10 and at the same time opens or closes the flaps 29 bounding the opening 12, which opening thereby forms a propulsive exhaust nozzle of adjustable section.

Similar means may be provided for cross-linked control of the flaps 32 and of the flaps 29 of propulsive nozzle 12 so as to produce reverse-thrust jets, as shown by the arrows in FIG. 3, and thereby proportion the propulsion and braking effects. Furthermore, similar cross-linked control may be provided between reversing flaps 32 and the vanes 26 for supplying rotor 4. These various dispositions are preferably adopted in order to ensure a substantially constant exhausting section and thereby avoid surge in the turbine 20, for when the vanes 26 controlling the air intake to rotor 4 close, the propulsive-exhaust flaps 29 open (and vice versa) to the same extent as regards variation in section, this being achieved as a result of the configurations adopted and the transmission ratios selected for the controls.

The principle of operation of the system hereinbefore disclosed is self-evident and calls for no lengthy explanations. Through concerted operation of vanes 26 and flaps 29 and 32, the fully-open configuration of vanes 26, which corresponds to full rotor power and is used for vertical or slow-speed forward flight, with the rotor 4 receiving as its drive fluid the entire output flow from compressor 9 and thereby producing maximum performance. Above a certain speed in forward flight, a transition is effected which gradually closes the vanes 26, with an attendant reduction in the air flow supplied to rotor 4, at the same time as the flaps 29 are progressively opened. Any ensuing reduction in the lift force of rotor 4 is offset by the additional lift the rotor acquires through being set in autorotation by the propulsive force exerted on the aircraft by the air exhausted through propulsion nozzle 12.

When vanes 26 are fully closed and flaps 29 fully open, lift is provided mainly by the autorotation of rotor 4, with possible assistance from auxiliary stubwings 49 which may be fitted to the aircraft in order to further relieve the aircraft at high forward flight speeds.

Decelerations can be obtained under the same functional conditions by using the flaps 32, with a possible compensating action between these reversing flaps 32, the propulsion flaps 29 and the vanes 26 for admitting the drive fluid to life rotor 4.

The foregoing dispositions, and more particularly the fact of driving compressor 24 with a turbine 20 having a power take-off wheel, make it possible to automatically match the rotation speed of the compressor and the pressure it delivers to the flight speed and the available power.

As already stated, the compensated operation of the different flaps and vanes enables a roughly constant total compressed air discharge section to be maintained and to thereby avoid surge, this being irrespective of the air admitted through intake 17 to the turbine 20.

The independent rotation speeds of the generating portion of turbine 20 and of compressor 24 make it possible to adapt a fixed geometry for the latter, that is to say without variable-pitch blades or adjustable guide-vanes, regardless of the flight conditions.

The turbine engine 20 is supplied with air by compressor 24 in distribution chamber 14, so that a boost effect occurs which improves the engine efficiency.

With this arrangement, the fact that turbine 20 exhausts through the nozzles 8 and 8a externally of distribution chamber 14 avoids a mixture of sold and hot gases, thus avoiding the risk of explosions of unburnt exhaust gases. The nozzles 8 and 8a moreover deliver additional thrust.

In the constructional forms hereinbefore described, the distribution of compressed air by compressor 24 is due to a plurality of flaps.

In the alternative embodiment shown in FIGS. 7 and 8, a single two-part flap performs the same function.

As is clearly shown in FIGS. 7 and 8, in which like parts are designated by like numerals followed by the index letter a or b as the case may be, the machinery supporting platform 2a of fuselage 1a is surmounted by a cowling 6a surrounding a distribution chamber and extended by a cowling 7a surrounding the engine. The latter drives a likewise freely rotatable rotor 4a having blades 5a. Through a reduction gear 21a, a turbine-wheel 20a drives a shaft 22a which in turn drives directly the wheel 24a of a compressor positioned downflow of a frontal opening 9a.

In this constructional form, the reduction gear 21a is driven by a shaft 50 rigid with a single or twin turbine wheel positioned inside the annular exhaust nozzle 8b directed towards the rear of the aircraft.

Longitudinally of the aircraft, the powerplant 20a and the shaft 22a are shrouded by a suitably profiled thick wall 51 which, rearwardly of the streamlined hub fairing 23a of wheel 24a, divides the distribution chamber 14a into two lateral chambers 14b and 14c to which correspond two propulsion-air exhaust openings 12a and 12b.

In the forward portion of distribution chamber 14a, beneath a streamlining element 52, is a central bracing member 3a which supports the bottom 54 of ducts extending up to exhaust nozzles 12a and 12b. On either side of this bracing member are ducts 53 which diverge away from the nose of said bracing member to extend on either side of the mast 3a before being joined once more in a chamber 55 for admitting air to turbine engine 20a.

Above the bottom portion 54, the lateral ducts 14b and 14c can be occluded by a pair of contoured flaps 56a and 56b the noses of which can be caused to bear either against the outer surface of the fairing 52 or beneath the internal wall of the top portion of cowling 6a. These flaps are hinged about a shaft 57 which is spaced from the bottom 54 and can be actuated by a crank-arm 58 controlled by a linkage 59. Above the shaft 57, an elbow section 60 has its wall extending into the contour of an annular cylindrical nozzle-like element bounded internally by the mast 3a and externally by the wall of elbow 60, and this nozzle likewise joins on to the top of the inner surface of cowling 6a, whereby to open opposite the inlet opening into the hub 11a or rotor 4a.

When the streamlined flaps 56a and 56b are applied against the fairing 52, all the air from compressor 24a is admitted into the rotor. Conversely, when the noses of these flaps are raised until they contact the inner surface of cowling 6a, all of this compressed air is channelled beneath the flaps and towards the exhaust nozzles 12a and 12b so as to perform uniquely a propulsion function.

Intermediate flap configurations permit transitions between hovering or vertical flight and forward flight.

Inside each of elbow sections 60 are provided fixed guide-vanes 61 to improve the flow.

Though not shown in the drawings, the orifices 12a and 12b may be provided with a thrust reversal device for decelerating purposes or for cancelling out the propulsive thrust during static ground tests of the aircraft.

The arrangement just disclosed makes it possible to apportion the compressed air in similar fashion to that described with reference to FIGS. 2 and 3, except that in this case the conjugate effect results solely from flaps 56a and 56b, which may be regarded as two parts of a single element, resulting in greater simplicity of control. The apportionment will clearly depend upon the configurations and relative positions of said flaps and upon the surfaces surrounding them.

It goes without saying that many changes and substitutions of parts may be made in the embodiments hereinbefore described without departing from the spirit and scope of the invention.

What we claim is:

1. In a propulsion and lift system using compressed-air reaction for a hybrid helicopter-autogyro type aircraft, having at least one main lifting rotor, a pylon mast for supporting the rotor, pneumatic driving means for said main rotor, a gas turbine engine and an air compressor mechanically coupled to said engine for generating compressed air which is directed by ducts to said driving means and to a propulsion nozzle, an improvement comprising a large distribution chamber for compressed air, a high-mass-flow/medium pressure air compressor disposed forwardly of said chamber, a turbine engine externally disposed with respect to said chamber, a power takeoff turbine wheel in said engine, a transmission shaft mechanically coupled to said compressor, said shaft traversing said chamber, a reduction gear having an input member mechanically coupled to said wheel and an output member mechanically coupled to said transmission shaft, at least one duct for supplying compressed air to said engine and opening in said chamber, a duct for supplying compressed air to said main-rotor driving means and likewise opening in said chamber, at least one propulsive exit with one end opening into said chamber and another end into open atmosphere, and distribution means for proportioning air supply to said propulsive exit and to said main-rotor driving means with substantially constant total section for the passage of compressed air to said driving means and to said exit.

2. In a propulsion and lift system as claimed in claim 1, wherein said distribution means comprises multiple elements for proportioning compressed air channelled to said main-rotor driving means and to said propulsive exit, said multiple elements comprising an annular duct surrounding said pylon mast and extending between said chamber and said driving means, radial vanes at the inlet end of said duct, and adjustable flaps associated with said propulsive exit.

3. In a propulsion and lift system as claimed in claim 1, comprising a distribution chamber including further jet reversal exits and flaps associated with said jet reversal exits.

4. In a propulsion and lift system as claimed in claim 1, wherein said distribution means comprises a single element for proportioning compressed air channelled to said main-rotor driving means and to said propulsive exit.

5. In a propulsion and lift system as claimed in claim 4, comprising lateral ducts extending between said chamber and propulsive exits, and retractable jet reversal means associated with each of said exits.

6. In a propulsion and lift system as claimed in claim 1, comprising a compressor having a fixed geometry.

(References on following page)

References Cited

UNITED STATES PATENTS

| | | | |
|---|---|---|---|
| 2,650,666 | 9/1953 | Dorand et al. | 170—135.4 |
| 2,696,079 | 12/1954 | Kappus. | |
| 2,944,394 | 7/1960 | Peregrine | 244—110 X |
| 3,045,894 | 7/1962 | Ross | 230—114 |
| 3,159,360 | 12/1964 | Ryan et al. | 170—135.4 X |
| 3,266,734 | 8/1966 | Gahagan et al. | 244—110 X |
| 3,312,425 | 4/1967 | Lennon et al. | 244—12 |
| 3,318,097 | 5/1967 | Wood et al. | 244—23 X |
| 3,368,778 | 2/1968 | Wilde et al. | 170—135.4 |
| 3,381,474 | 5/1968 | Gist | 60—224 |

FOREIGN PATENTS 851,153  10/1960  Great Britain.

MILTON BUCHLER, Primary Examiner

P. E. SAUBERER, Assistant Examiner

U.S. Cl. X.R.

60—229; 170—135.4; 244—17.19, 17.11